United States Patent [19]

Satake

[11] Patent Number: 4,717,306

[45] Date of Patent: Jan. 5, 1988

[54] HAND-OPERATED PALLET CHANGER

[75] Inventor: Eishin Satake, Kanazawa, Japan

[73] Assignee: Tsudakoma Kogyo Kabushiki Kaisha, Ishikawa, Japan

[21] Appl. No.: 938,901

[22] Filed: Dec. 8, 1986

[30] Foreign Application Priority Data

Dec. 28, 1985 [JP] Japan .............................. 60-293473

[51] Int. Cl.$^4$ .............................................. B65H 1/00
[52] U.S. Cl. .............................. 414/222; 198/346.1;
 198/345; 269/57; 104/35; 104/47; 104/254
[58] Field of Search .................. 198/345, 346.1, 465.1;
 414/222, 223, 744 R; 29/33 P, 563, 568, 1 A;
 269/57; 104/35, 47, 249, 254

[56] References Cited

U.S. PATENT DOCUMENTS

| | | | |
|---|---|---|---|
| 3,825,245 | 7/1974 | Osburn et al. .................. | 198/346.1 |
| 3,986,617 | 10/1976 | Blomquist ........................ | 198/346.1 |
| 4,181,211 | 11/1980 | Nishimura et al. .............. | 198/346.1 |
| 4,291,797 | 9/1981 | Ewertowski ...................... | 29/33 P |
| 4,326,624 | 4/1982 | Ewertowski et al. ............ | 198/346.1 |
| 4,565,480 | 1/1986 | Merk et al. ...................... | 198/465.1 |

Primary Examiner—Joseph E. Valenza
Attorney, Agent, or Firm—Armstrong, Nikaido, Marmelstein & Kubovcik

[57] ABSTRACT

A hand-operated work pallet changer for changing work pallets to be fed onto a pallet mounting portion of a machine tool, comprises a turntable (58) rotatably supported on a base unit and having at least two supporting portions (62, 63) for supporting thereon work pallets (2), respectively, and a table-indexing unit (67) for stopping a rotational movement of the turntable and locking the turntable when each of the supporting portions of the turntable arrives at a predetermined position (C) in which each of the supporting portions is in alignment with the pallet mounting portion of the machine tool. A movable hook (68) is provided on the base unit to prevent a rebound of the work pallet fed from the pallet mounting portion of the machine tool onto one of the supporting portions located at the predetermined position.

7 Claims, 7 Drawing Figures

HAND-OPERATED PALLET CHANGER

BACKGROUND OF THE INVENTION

1. Field of the Invention

The present invention relates to a pallet changer used for changing work pallets to be fed onto a machine tool, such as a machining center, and more particularly, to a hand-operated pallet changer.

2. Description of the Related Arts

Generally, a machine tool, such as machining center, has a pallet mounting portion provided with a clamping device for locating and clamping a work pallet on the mounting portion. The work pallet is designed so that a work piece can be secured thereon. A work pallet located on the mounting portion of the machine tool must be changed efficiently for a new one after the machining of the work piece on the work pallet located on the mounting portion of the machine tool is finished, and the work piece secured on the work pallet must be changed for a new one after the work pallet is removed from the mounting portion of the machine tool.

Recently, a pallet changer has been used for the above-mentioned changing operation of the work pallets. A conventional pallet changer is generally designed to automatically change the work pallet, located on the mounting portion of the machine tool, by actuators driven by a hydraulic, pneumatic or electric power source, and accordingly, can dispence with unnecessary labor for the changing operation of the work pallets. However, such an automatic pallet changer is expensive and is difficult to maintain and further, when such an automatic pallet changer is installed, additional electric wiring must be provided. Furthermore, such an automatic work pallet changer requires an additional space for the installation of a hydraulic, pneumatic or electric power unit. Therefore, in a relatively small-scale plant, it often becomes difficult to install the automatic pallet changer with a power unit after a machine tool has been installed, due to restrictions in installation space.

SUMMARY OF THE INVENTION

Accordingly, it is an object of the present invention to provide a hand-operated pallet changer having a simple structure which can ensure an easy and safe manual-changing operation for work pallets and provide a low cost installation and maintenance thereof.

Another object of the present invention is to provide a hand-operated pallet changer which can be easily installed at an existing machine tool, such as a machining center, e.g., after the machine tool has been installed.

The present invention provides a hand-operated pallet changer for changing work pallets to be fed onto a pallet mounting portion of a machine tool, each of the work pallets being adapted to secure a work piece thereon, comprising:

a base arranged in the vicinity of the machine tool;

a turntable rotatably supported on the base unit and having at least two supporting portions for supporting the work pallets thereon, respectively, the supporting portions being spaced from each other in a rotational direction of the turntable;

a table-indexing unit for stopping a rotational movement of the turntable and locking the turntable when each of the supporting portions of the turntable arrives at a predetermined position in which each of the supporting portions is in alignment with the pallet mounting portion of the machine tool; and a movable hook for preventing a rebound of the work pallet fed from the pallet mounting portion of the machine tool onto one of the supporting portions located at the predetermined position, the movable hook having a stopper portion for stopping the work pallet fed from the pallet mounting portion of the machine tool onto one of the supporting portions located at the predetermined position, and being movably supported on the base unit so as to move between a releasing position in which the movable hook permits the movement of the work pallet from one of the supporting portions located at the predetermined position toward the mounting portion of the machine tool and a latching position in which the movable hook can prevent a rebound of the work pallet from one of the supporting portions, located at the predetermined position, toward the supporting portion of the machine tool, the movable hook being moved from the releasing position to the latching position by a pushing force acting on the stopper portion thereof from the work pallet fed from the pallet mounting portion of the machine tool onto one of the supporting portions of the turntable, and moved from the latching position to the releasing position by a pushing force acting thereon from the work pallet when one of the supporting portions departs from the predetermined position in the rotational direction of the turntable.

In the hand-operated pallet changer according to the present invention, the work pallet is fed from the mounting portion onto one of the supporting portions of the turntable by a hand operation when one of the supporting portions is locked at the predetermined position by the table-indexing unit.

When the work pallet fed from the machine tool onto the supporting portion of the turntable located at the predetermined position pushes the movable hook, the movable hook moves to latch the work pallet. Therefore, a rebound of the work pallet fed from the machine tool can be prevented by the movable hook.

The turntable can rotate freely when the table-indexing unit releases the turntable, and the turntable can be then rotated by hand. When the supporting portion supporting thereon the work pallet fed from the machine tool departs from the predetermined position in the rotational direction of the turntable, the movable hook is moved to release the work pallet supported on the supporting portion by a pushing force of the work pallet acting thereon.

Preferably, in the pallet changer according to the present invention, the pallet indexing unit includes a first stopper unit supported on the base unit, and a plurality of second stopper units supported on the turntable and spaced from each other in the rotating direction of the turntable at the same intervals as those of the supporting portions, each of the second stopper units being movable between an engaging position in which the first stopper can catch and lock the second stopper unit when a corresponding supporting portion arrives at the predetermined position and a disengaging position in which the first stopper unit can not collide with the second stopper unit, each of the second stopper units being connected with the movable hook only when the corresponding supporting portion of the turntable is located at the predetermined position, and moved from one of the disengaging and engaging positions to the other position in accordance with the movement of the movable hook from one of the latching and releasing positions to the other position.

In the above-mentioned preferred embodiment of the present invention, the second stopper unit of the table indexing unit is located at the engaging position and the first stopper unit can catch and lock the second stopper unit when the corresponding supporting portion of the turntable arrives at the predetermined position. The second stopper unit is also connected with the movable hook located at the releasing position when the corresponding supporting portion of the turntable arrives at the predetermined position. The second stopper unit moves from the engaging position to the disengaging position in accordance with the movement of the movable hook, and thus the table-indexing unit releases the turntable when the movable hook moves from the releasing position to the latching position. Namely, the supporting portion of the turntable is fixed to the predetermined position by the table-indexing unit until the movable hook latches the work pallet fed from the machine tool. Therefore, a feeding operation of the work pallet from the mounting portion of the machine tool onto the supporting portion of the turntable can be safely effected.

Further, when the supporting portion of the turntable is rotated away from the predetermined position, the movable hook is moved from the latching position to the releasing position by the cam mounted on the work pallet, and the second stopper unit is moved from the disengaging position to the engaging position in accordance with the movement of the movable hook when the movable hook moves from the latching position to the releasing position. Therefore, the first stopper unit of the table-indexing unit can stop and lock the second stopper unit supported on the turntable when the supporting portion of the turntable arrives at the predetermined position.

In this way, in the above-mentioned preferred embodiment of the present invention, the table-indexing unit can move to lock and release the turntable in accordance with the respective movements of the movable hook between the engaging and disengaging positions without a specific hand operation other than a hand operation for feeding the work pallet from the mounting portion of the machine tool onto the supporting portion of the turntable and for rotating the turntable. Therefore, according to the above-mentioned preferred embodiment of the present invention, a pallet changing operation can be effected by only a very simple hand operation.

BRIEF EXPLANATION OF THE DRAWINGS

The foregoing and other objects and advantages of the present invention will be better understood from the following description with reference to the preferred embodiments illustrated in the drawings; wherein.

DESCRIPTION OF THE PREFERRED EMBODIMENTS

Figure 1:
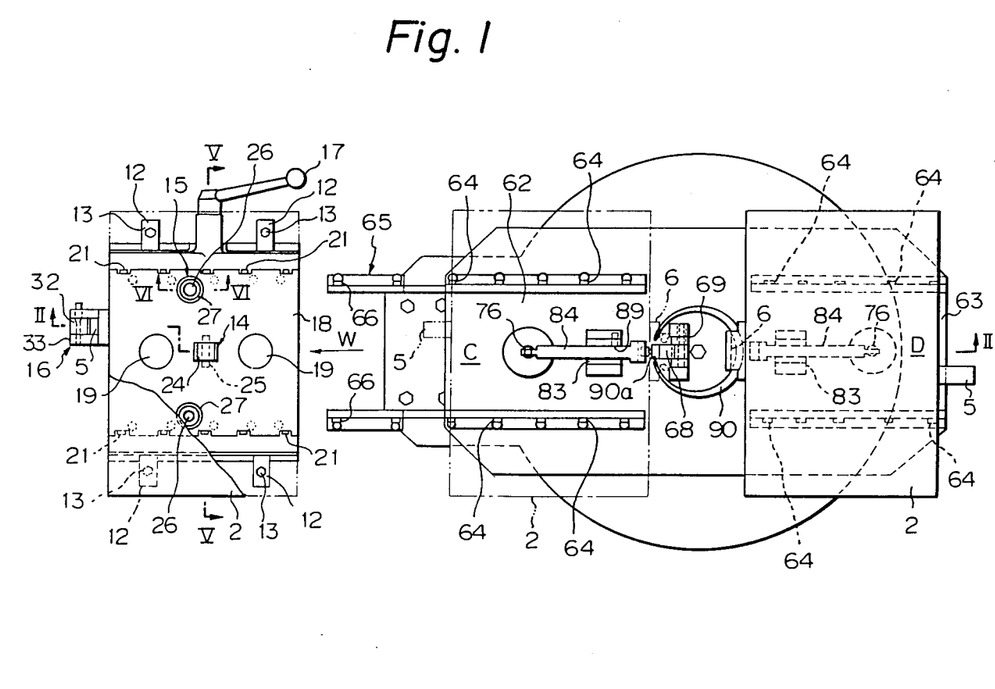
FIG. 1 is a plane view of a pallet changer according to one embodiment of the present invention, and of a pallet clamping device mounted on a machine tool.
Figure 2:
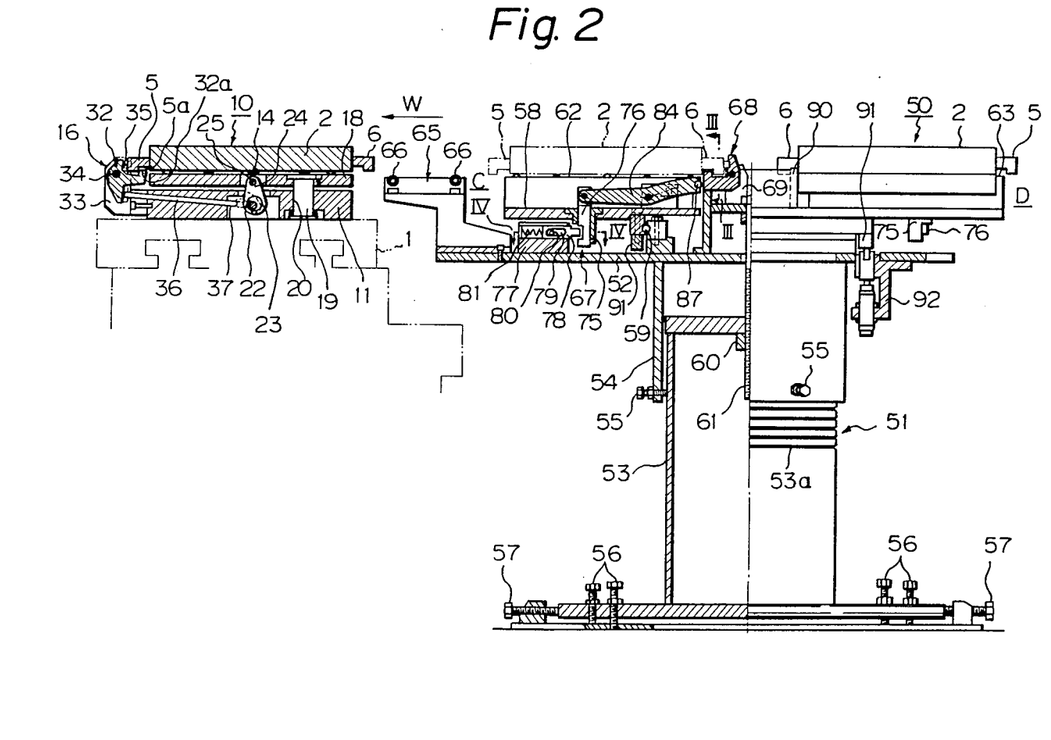
FIG. 2 is a cross-sectional view of the pallet changer and the pallet clamping device taken along the line II—II in FIG. 1.
Figure 3:
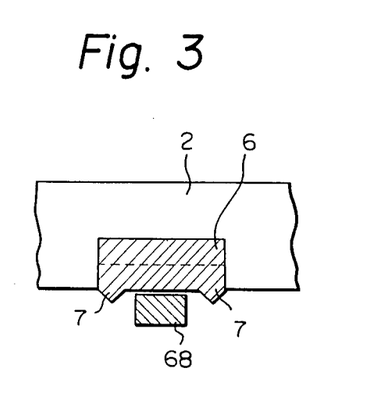
FIG. 3 is a cross-sectional view of the pallet changer taken along the line III—III in FIG. 2.
Figure 4:
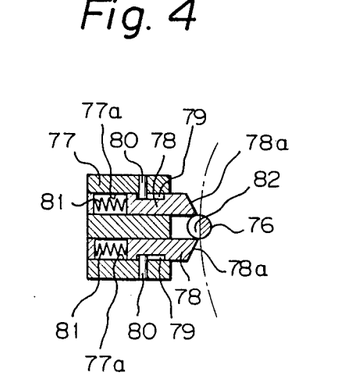
FIG. 4 is a cross-sectional view of the pallet changer taken along the line IV—IV in FIG. 2.
Figure 5:
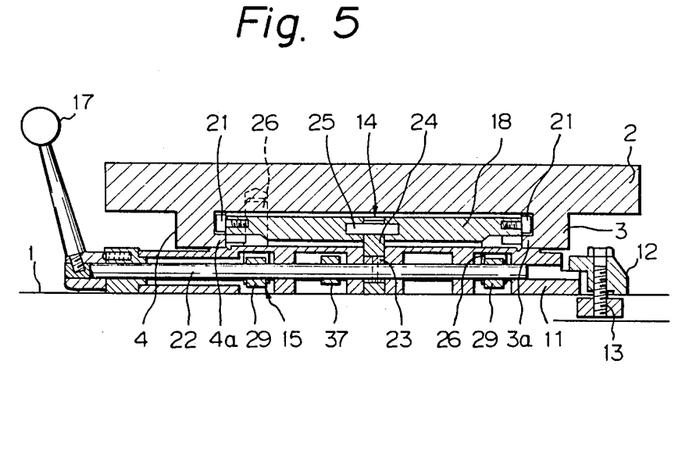
FIG. 5 is a cross-sectional view of the pallet clamping device taken along the line V—V in FIG. 1.
Figure 6:
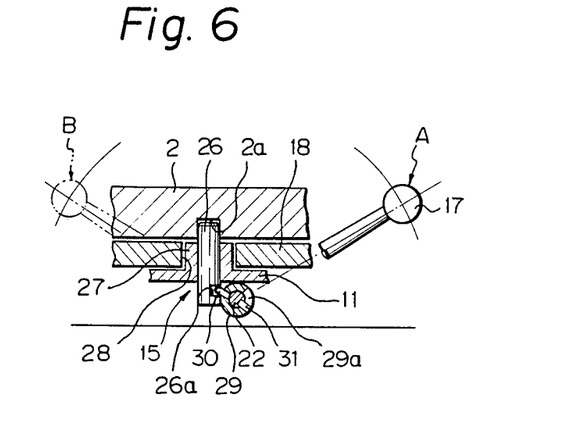
FIG. 6 is a cross-sectional view of the pallet clamping device taken along the line VI—VI in FIG. 1.
Figure 7:
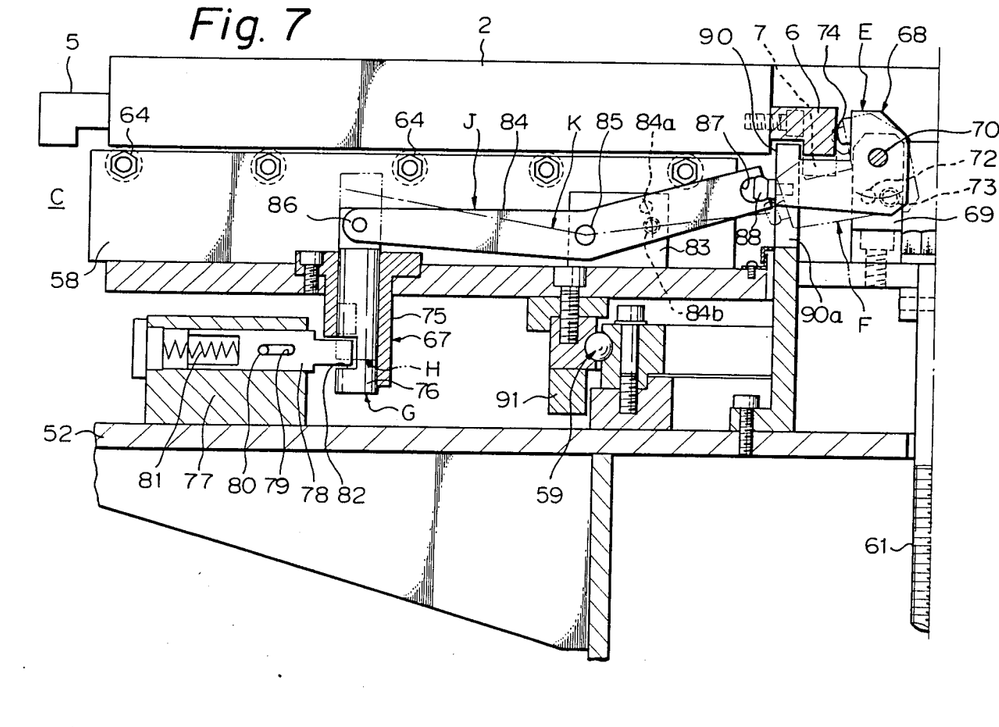
FIG. 7 is an enlarged cross-sectional view of a main part of the pallet shown in FIG. 2.

FIGS. 1 to 7 show a hand-operated pallet changer according to a preferred embodiment of the present invention applied to a machine tool such as machining center having a hand-operated pallet clamping device forming a pallet mounting portion. In FIGS. 1 and 2, the pallet clamping device and the pallet changer are denoted generally by reference numerals 10 and 50, respectively. The main parts of the pallet changer are shown in FIGS. 3, 4, and 7, respectively, and the main parts of the pallet clamping device are shown in FIGS. 5 and 6, respectively.

The construction of the pallet clamping device 10 and the mode of operation thereof will be now described in detail.

Referring to FIGS. 1, 2, and 5, the hand-operated pallet clamping device 10 comprises a base block 11 secured to a work table 1 of the machine tool. In this embodiment, the base block 11 can be located at a desired position on the work table 1 and fixed thereto by clasps 12 and tightening bolts 13.

The pallet clamping device 10 further comprises a clamping unit 14 for clamping a work pallet 2 on the base block 11, a locating unit 15 for locating the work pallet 2 on the base block 11, a latch unit 16 for preventing a rebound of the work pallet 2 fed onto the base block 11, and a hand-operating lever 17.

The clamping unit 14 is provided with a clamping plate 18, and the clamping plate 18 is provided with guide poles 19 fixed thereto. As shown in FIG. 2, the guide poles 19 extend downwardly from the clamping plate 18 and are slidably fitted into guide holes 20, respectively.

As shown in FIG. 1, the clamping plate 18 is provided with a plurality of rollers 21 arranged in two rows along a feeding direction of the work pallet 2. The feeding direction of the work pallet 2 is shown by an arrow W in FIG. 1. As apparent from FIG. 5, the uppermost portion of the outer circumferential surface of each of the rollers 21 is located above the upper surface of the clamping plate 18, and the lowermost portion of the outer circumferential surface of each of the rollers 21 is located above the under surface of the clamping plate 18.

As shown in FIG. 5, the work pallet 2 is provided at the under surface thereof with a pair of legs 3 and 4 extending downwardly from the work pallet 2 and horizontally in the feeding direction of the work pallet 2. The legs 3 and 4 are provided at the lower ends thereof with ribs 3a and 4a, respectively, extending inwardly from the legs 3 and 4.

The clamping plate 18 can move vertically in relation to the base block 11. When the clamping plate 18 is located at the upper position, the clamping unit 14 is kept in an unclamped state, and the rollers 21 can come in contact with the work pallet 2 fed onto the pallet clamping device 10 to support the work pallet 2. In this state, the under surface of the clamping plate 18 is located above the ribs 3a and 4a, and the under surfaces of the ribs 3a and 4a are located above the upper surface of the base block 11. Consequently, the work pallet 2 fed onto the pallet clamping device 10 can be smoothly guided by the rollers 21.

On the other hand, when the clamping plate 18 is shifted downwardly from the upper position, the clamping unit 14 is brought to a clamping state, and the ribs 3a and 4a of the work pallet 2 are clamped by the clamping plate 18 and the base block 11 between the under surface of the clamping plate 18 and the upper surface of the base block 11. At this time, the rollers 21 are separated from the under surface of the work pallet 2.

The base block 11 is provided with an operating shaft 22 extending horizontally in a direction perpendicular to the feeding direction of the work pallet 2, and rotatably supported thereon. The operating shaft 22 is provided at one end thereof with a hand-operated lever 17 fixed thereto. As shown in FIGS. 2 and 5, the operating shaft 22 is provided with an eccentric cam 23 fixed thereto approximately at the center of the pallet clamping device 10. The eccentric cam 23 is rotatably fitted into a link 24 which is pivotably supported on the clamping plate 18 through a pin 25. When the operating shaft 22 is rotated about the axis thereof by the hand-operated lever 17, the clamping plate 18 is shifted vertically together with the link 24, by the action of the eccentric cam 23 on the link 24, and accordingly, the clamping plate 18 is brought to the above-described unclamped or clamping state.

As shown in FIGS. 1 and 6, the locating unit 15 comprises a pair of locating pins 26 which are slidably fitted into bosses 27 provided on the base block 11, respectively. The bosses 27 are loosely fitted into holes 28 formed in the clamping plate 18, respectively. The work pallet 2 is formed with locating holes 2a which can closely and slidably fit over the location pins 26, respectively. The work pallet 2 can be located in place of the base block 11 upon the engagement of the location pins 26 with the locating holes 2a.

As shown in FIG. 5, the operating shaft 22 is provided with a pair of cams 29 for vertically shifting the locating pins 26. The cams 29 are arranged adjacent to the locating pins 26, respectively, and rotatably mounted on the operating shaft 22. As shown in FIG. 6, the cam 29 has a pin 30 projecting radially therefrom and engaging with a notch 26a formed in the corresponding locating pin 26. The cam 29 also has a sectorial slit 29a extending radially therethrough and circumferentially through a predetermined section. The operating shaft 22 is provided with pins 31 fixed thereto and extending radially therefrom into the slits 29a of the cams 29, respectively. In the situation shown in FIG. 6, the hand-operated lever 17 is located at a position denoted by the reference character A, the top end of the locating pins 26 are inserted into the locating holes 2a of the work pallet 2, and the clamping unit 14 is in the clamping state. When the hand-operated lever 17 is moved from the position A to a position denoted by reference character B in FIG. 6, the operating shaft 22 and pins 31 fixed thereto are rotated together with the lever 17. Since the pins 31 are inserted into the slits 29a of the cams 29, the cams 29 and pins 30 fixed thereto are maintained at the position shown in FIG. 6, while the pins 31 move within the slits 29a of the cams 29. Then, the pins 31 act on the cams 29 to rotate together with the operating shaft 22, and accordingly, the pins 30 of the cams 29 act on the locating pins 26 to move downwardly apart from the locating hole 2a of the work pallet 2. When the hand-operated lever 17 is located at the position B, the clamping unit 14 is in the unclamped state and the locating pins 26 are disengaged from the locating holes 2a of the work pallet 2. Therefore, the work pallet 2 can be fed out from the pallet clamping device 10.

Referring to FIGS. 1 and 2, the latch unit 16 comprises a movable hook 32 which is swingably supported though a pin 34 on a bracket 33 fixed to the base block 11. The movable hook 32 is formed with a stopper 35 which abuts against a stationary hook 5 fixed to the work pallet 2, and with a projection 32a which engages with a groove 5a formed in the stationary hook 5 of the work pallet 2. In the situation shown in FIG. 2, the movable hook 32 is located at a disengaging position, as illustrated by a solid line. When the stopper 35 of the movable hook 32 is pushed by the stationary hook 5 of the work pallet 2 fed onto the pallet clamping device 10, the projection 32a of the movable hook 32 engages with the groove 5a of the stationary hook 5, as illustrated by a dotted line in FIG. 2. A ball (not shown) is held in the bracket 33 and urged toward one side surface of the movable hook 32 by a spring force, and the movable hook 32 is formed at the one side surface thereof having two spaced concavities (not shown) which engage with the ball when the movable hook 32 is located at the engaging and disengaging positions relative to the stationary hook 5, respectively, so as to hold the movable hook 32 at the engaging and disengaging positions. Since the movable hook 32 is kept at the engaging position upon the engagement of the ball with the corresponding concavity of the movable hook 32 when the projection 32a of the movable hook 32 engages with the stationary hook 5 of the work pallet 2, a rebound of the work pallet 2 fed onto the pallet clamping device 10 is prevented.

As shown in FIG. 2, a push rod 36 is slidably supported on the base block 11 in the longitudinal direction thereof. An upper end of the push rod 36 abuts against the movable hook 32. The operating shaft 22 is provided with a cam 37 fixed thereto and able to act on the lower end of the push rod 36 so as to move the push rod 36 toward the movable hook 32. When the hand-operated lever 17 is located at the position B in FIG. 6, that is, an unclamped state, the top end of the cam 37 is located under the lower end of the push rod 36. When the hand-operated lever 17 is moved from the position B toward the position A in FIG. 6, the cam 37 rotates together with the operating shaft 22 and acts on the lower end of the push rod 36 to move it toward the movable hook 32, and thus, the movable hook 32 is moved from the engaging position to the disengaging position against the stationary hook 5 of the work pallet 2 by a pushing force of the push rod 36. When the hand-operated lever 17 is located at the position A in FIG. 6, the top end of the cam 37 is located above the lower end of the push rod 36.

In the above-mentioned pallet clamping device 10, as apparent from the foregoing description, when the work pallet 2 on which a work piece (not shown) to be machined is secured is fed from the pallet changer 50 onto the pallet clamping device 10, and the stopper 35 of the movable hook 32 is pushed by the stationary hook 5 of the work pallet 2, the movable hook 32 engages with the stationary hook 5 and prevents a rebound of the work pallet 2.

Then, the hand-operated lever 17 is moved manually from the unclamping position B toward the clamping position A, and thus the operating shaft 22 is rotated together with the lever 17. In this situation, the locating pins 26 are inserted into the locating holes 2a of the work pallet 2 by a shifting force of the pin 30 of the cam 29 acting thereon, and thus the work pallet 2 is located in place of the pallet clamping device 10. At the same time, the clamping plate 18 is moved downwardly by a pushing-down force of the eccentric cam 23 acting on the link 24 joined to the clamping plate 18, and then the work pallet 2 is clamped by the clamping plate 18 on the base block 11. Further, the movable hook 32 is moved from the engaging position to the disengaging position against the stationary hook 5 of the work pallet 2 by a pushing force of the cam 37 acting on the movable hook 32 through the push rod 36 when the lever 17 is moved from the unclamping position B to the clamping position A.

After the machining of the work piece on the work pallet 2 is finished, the hand-operated lever 17 is moved manually from the clamping position A to the unclamping position B. Accordingly, the clamping unit 14 is changed from the clamped state into the unclamped state, and the locating pins 26 of the locating unit 15 are disengaged from the locating holes 2a of the work pallet 2. At this time, since the movable hook 32 is already kept in the disengaging position in relation to the stationary hook 5 of the work pallet 2, the work pallet 2 can be fed from the clamping plate 18 of the pallet clamping device 10 toward the pallet changer 50 immediately after the hand-operating lever 17 is moved from the clamping position A to the unclamping position B.

Next, the construction of the pallet changer 50 shown in the drawings and the mode of operation thereof will be described in detail.

Referring to FIGS. 1 to 4, the pallet changer 50 comprises a base unit 51 including an inner tubular column 53, an outer tubular column 54, and a base plate 52 fixed to the outer tubular column 54. The outer surface of the inner tubular column 53 is formed with a plurality of annular grooves 53a arranged vertically at equidistant intervals. The outer tubular column 54 is fixed to the inner tubular column 53 by tightening a plurality of clamping screws 55 which engage with one of the annular grooves 53a. The height of the base plate 52 can be changed stepwise by selecting the groove 53a to be engaged with the clamping screws 55. The position of the inner tubular column 53 can be adjusted vertically and horizontally by a plurality of fine adjusting screws 56 and 57.

A turntable 58 is arranged above the base plate 52 and rotatably supported thereon through a bearing 59. The turntable 58 is provided with a screw shaft 61 rotatably supported thereto. The screw shaft 61 extends downwardly from the turntable 58 through the base plate 52 and is screwed into a nut 60 fixed to the inner tubular column 53. The height of the turntable 58 from the base plate 52 can be adjusted by rotating the screw shaft 61 is relation to the nut 60.

As apparent from FIGS. 1 and 2, the turntable 58 has thereon two opposed supporting portions 62 and 63 for the work pallet 2, which are arranged at an angular interval of 180 degrees from each other in the rotational direction of the turntable 58. A plurality of rollers 64 for supporting thereon the work pallet 2 and carrying the work pallet 2 in the radial direction of the turntable 58 are arranged on the turntable 58 along the opposite sides of each of the supporting portions 62 and 63 and rotatably supported on the turntable 58. When the supporting portions 62 and 63 of the turntable 58 are located at a predetermined first position C in which the supporting portions 62 and 63 are in alignment with the pallet clamping device 10, the work pallet 2 can be transferred between the pallet clamping device 10 and the supporting portions 62 and 63 of the turntable 58. On the other hand, when the supporting portions 62 and 63 are located at a second position D opposite to the first position C, a work piece (not shown) on the work pallet 2 can be changed for a new one.

The base plate 52 is provided thereon with a junction guide unit 65 for supporting and carrying thereon the work pallet 2 between the clamping plate 18 of the pallet clamping device 10 and the turntable 58. The middle guide unit 65 comprises a plurality of supporting rollers 65 arranged along the opposite sides thereof.

The pallet changer 50 further comprises an table-indexing unit 67 for indexing a stop position of the turntable 58 so that the supporting portions 62 and 63 of the turntable 58 can stop at the first position C, and a movable hook 68 for preventing a rebound of the work pallet 2 fed onto the supporting portions 62 and 63 of the turntable 58 from the pallet clamping device 10.

Referring to FIG. 7, the movable hook 68 is swingably supported on a bracket 69 fixed to the base plate 52 through a pin 70. The work pallet 2 is provided at one end thereof with the stationary hook 5 fixed thereto, as described above, and at the other end thereof with another stationary hook 6 fixed thereto. The position of the movable hook 68 can be changed between a latching position E (shown by solid line) in which the movable hook 68 engages with the stationary hook 6 of the work pallet 2 and a releasing position F (shown by two-dotted line) in which the movable hook 68 disengages from the stationary hook 6. The movable hook 68 has two concavities formed at one side surface thereof (not shown), and the bracket 69 is provided with a ball (not shown) movably held therein and urged toward the side surface of the movable hook 68 by a spring force. The movable hook 68 can be kept in the latching position E and the releasing position F by an engagement of the ball with the concavities of the movable hook 71.

The movable hook 68 is provided with a stopper portion 74 which abuts against the stationary hook 6 of the work pallet 2 fed onto the turntable 58 from the pallet clamping device 10. When the stopper portion 74 of the movable hook 68 is pushed by the work pallet 2 fed onto the turntable 58, the position of the movable hook 68 changes from the releasing position F to the latching position E, and accordingly, a rebound of the work pallet 2 is prevented by an engagement of the movable hook 68 with the stationary hook 6 of the work pallet 2.

As shown in FIG. 3, the stationary hook 6 of the work pallet 2 is provided at the opposite sides thereof with cams 7 for changing the position of the movable hook 68 from the latching position E to the releasing position F. When the supporting portions 62 and 63 of the turntable 58 are rotated away from the position C in either the clockwise or counterclockwise direction in FIG. 1, one of the cams 7 acts on the movable hook 68 to change the position thereof from the latching position E to the releasing position F. Therefore, it is possible to operate the movable hook 68 without bindrance when the work pallet 2 is fed from the pallet clamping device 10 onto one of supporting portions 62 and 63 of the turntable 58 located at the position C.

The construction of the table-indexing unit 67 and a mode of operation thereof is described hereinafter. Referring to FIGS. 2, 4, and 7, the table-indexing unit 67 comprises a first stopper unit and two second stopper units. The second stopper units comprise pin holders 75 fixed to the turntable 58 beneath the supporting positions 62 and 63, respectively, and indexing pins 76 slidably inserted into the pin holders 75 in the vertical direction, respectively. The first stopper unit of the table-indexing unit 67 comprises a stopper holder 77 fixed to the base plate 52 and having a pair of cylindrical bores 77a extending horizontally in parallel to each other, and a pair of indexing stoppers 78 slidably inserted into the bores 77a of the stopper holder 77, respectively, as shown in FIG. 4. Pins 80 fixed to the stopper holder 77 engage with elongated grooves 69 formed in the indexing stoppers 78 to limit the moving stroke of the indexing stoppers 78, respectively. The stopper holder 77 is provided with springs 81 for urging the indexing stoppers 78 to protrude from the bores 78a of the stopper holder 77. A space for receiving one of the indexing pins 76 is defined between the tip ends of the pair of indexing stoppers 78.

The indexing pins 76 are located on the turntable 58 so that when the supporting portions 62 and 63 are located at the position C, the corresponding indexing pins 76 are located between the tip ends of the indexing stoppers 78, respectively. As shown in FIG. 7, the indexing pin 76 is formed with a notch 82. The notch 82 moves in accordance with the vertical movement of the indexing pin 76. When the indexing pin 76 is located at a predetermined lower position G (shown by a solid line in FIG. 7), the height of the notch 82 from the base plate 52 is the same as that of the indexing stoppers 78, i.e., the indexing pin 76 is located at a disengaging position, and accordingly, the turntable 58 can rotate freely. On the other hand, when the indexing pin 76 is located at a predetermined upper position H (shown by a two-dotted line in FIG. 7), the vertical position of the notch 82 deviates from that of the indexing stoppers 78, that is, the indexing pin 76 is located at an engaging position, and accordingly, the indexing stoppers 78 can catch and lock the indexing pin 76 when the corresponding supporting portion arrives at the position C.

As shown in FIG. 4, the indexing stoppers 78 are formed at the tip portions thereof with inclined cam surfaces 78a respectively. When the indexing pin 76 is located at the position H, the indexing pin 76 comes into contact with the inclined cam surface 78a of one of the indexing stoppers immediately before the corresponding one of the supporting portions 62 and 63 of the turntable 58 arrives at the position C, and the indexing pin 76 then pushes the indexing stopper 78 into the bore 77a of the stopper holder 77 against the force of the spring 81. When one of the supporting portions 62 and 63 of the turntable 58 arrives at the position C, the indexing pin 76 is located between the indexing stoppers 78 and restricted therebetween, whereby an indexing of the turntable 58 is concluded.

As shown in FIGS. 1 and 7, the second stopper unit of the table-indexing unit 67 further includes brackets 83 fixed to the turntable 58 beneath the supporting portions 62 and 63, and levers 83 swingably supported through pins 85 on the brackets 83, respectively, for changing the position of the indexing pins 76 between the lower engaging position G and the upper disengaging position H. Each operating lever 83 is joined at one end thereof to the corresponding indexing pin 76 through a pin 86, and formed at the other end thereof with an engaging groove 87. As shown in FIG. 7, the movable hook 68 is provided with an engaging pin 88 fixed thereto which is able to engage with the engaging groove 87 of the operating lever 84. When the engaging pin 88 of the movable hook 68 is engaged with the engaging groove 87 of the operating lever 84, the operating lever 84 is moved swingingly between a first position J, shown by a solid line, and a second position K, shown by a dotted center line in FIG. 7, in response to the movement of the movable hook 68 between the engaging position E and the disengaging position F, to move the corresponding indexing pin 76 vertically between the lower disengaging position G and the upper engaging position H. Each operating lever 84 is formed at one side surface thereof with two concavities 84a and 84b, and the corresponding bracket 83 is provided with a ball 89 (shown in FIG. 1) movably held therein and urged toward the one side surface of the operating lever 84. The operating lever 84 can be kept in the first and second positions J and K by engagement of the ball 89 with these concavities 84a and 84b, respectively.

The mode of operation of the operating lever 84 will now be described in more detail. The operating lever 84 is located at the position K when the corresponding one of the supporting portions 62 and 63 of the turntable 58 is moved toward the position C, and thus the corresponding indexing pin 76 is located at the upper engaging position H. When the corresponding one of the supporting portions 62 and 63 of the turntable 58 arrives at the position C, the engaging groove 87 of the corresponding operating lever 84 comes into engagement with the engaging pin 88 of the movable hook 68 located at the releasing position F. In this situation, when the movable hook 68 is moved from the releasing position F to the latching position E by a pushing force of the work pallet 2 fed from the pallet clamping device 10 onto the turntable 58, the operating lever 84 moves from the second position K to the first position J, and thus the corresponding indexing pin 76 moves from the upper engaging position H to the lower disengaging position G. That is, the indexing unit 67 is brought to a nonindexing state.

Then, the turntable 58 is rotated manually. When the indexing pin 76 is moved away from the indexing stoppers 78 by a rotational movement of the turntable 58, the movable hook 68 is moved from the latching position E to the releasing position F by a pushing force of the cam 7 of the stationary hook 6 of the work pallet 2 acting thereon. Accordingly, the operating lever 84 is moved from the first position J to the second position K, and thus the corresponding indexing pin 76 is moved from the lower disengaging position G to the upper engaging position H. The engaging groove 87 of the operating lever 84 is disengaged from the engaging pin 88 of the movable hook 68 by a rotational movement of the turntable 58.

As apparent from FIGS. 1, 2, and 7, the base plate 52 is provided with a guide ring 90 fixed thereto. The guide ring 90 engages with the stationary hook 6 of the work pallet 2 and prevents radial movement of the work pallet 2 while the supporting portions 62 and 63 of the turntable 58 move away from the position C. The guide ring 90 has a notch 90a, and the movable hook 71 is located in the notch 90a, so that the stationary hook 6 of the work pallet 2 comes into engagement with the guide ring 90 immediately after the stationary hook 6 disengages from the movable hook 71, as the turntable 58 is rotated.

The guide ring 90 has a relatively thin thickness in the vicinity of the notch 90a so that the stationary hook 6 of the work pallet 2 can easily engage with the guide ring 90. The thickness of the guide ring 90 increases continuously in the circumferential direction away from the vicinity of the notch 90a, and the guide ring 90 has a maximum thickness at a position opposite to the notch 90a in the diametrical direction thereof so as to closely engage with the stationary hook 6 of the work pallet 2. Consequently, the work piece supported on the work pallet 2 can be easily changed when the work pallet 2 is located at the position D.

As shown in FIG. 2, the turntable 58 is provided at the underside thereof with two projecting cams 91 fixed thereto, and the base plate 52 is provided with a damper 92 which acts on the projecting cams 91 to reduce the rotational torque to the turntable 58 when the supporting portions 62 and 63 of the turntable 58 approach the position C. Therefore, the table-indexing unit 67 is not subjected to an excessive impact force when stopping the turntable 58.

In the pallet changer 50 having the above-described construction, the latching unit 68 and indexing unit 67 are mechanically and automatically moved in accordance with the manual movement of the work pallet 2. Therefore, a change of the work pallet 2 can be easily and safely effected by using the pallet changer 50.

Although particular embodiments of the present invention illustrated in the drawings have been described, it will be understood, of course, that the present invention is not limited thereto, since modifications can be easily made by those skilled in the art in the light of the foregoing teaching. For example, a turntable having more than two supporting portions for the work pallet may be used. In this case, the table-indexing unit must include more than two second stopper units, to index the stop position of the respective supporting portions.

I claim:

1. A hand-operated pallet changer for changing work pallets to be fed onto a pallet mounting portion of a machine tool, each of said work pallets being adapted to secure a work piece thereon, comprising:
   a base unit arranged in a vicinity of said machine tool;
   a turntable rotatably supported on said base unit and having at least two supporting portions for supporting said work pallets thereon, respectively, said supporting portions being spaced from each other in a rotational direction of said turntable;
   a table-indexing unit for stopping a rotational movement of said turntable and locking said turntable when each of said supporting portions of said turntable arrive at a predetermined position in which each of said supporting portions is in alignment with said pallet mounting portion of said machine tool; and
   a movable hook for preventing a rebound of said work pallet fed from said pallet mounting portion of said machine tool onto one of said supporting portions located on said predetermined position, said movable hook having a stopper portion for stopping said work pallet fed from said pallet mounting portion of said machine tool onto one of said supporting portions located on said predetermined position and being movably supported on said base unit so as to move between a releasing position in which said movable hook permits a movement of said work pallet from said one of said supporting portions located on said predetermined position toward said mounting portion of said machine tool and a latching position in which said movable hook can prevent a rebound of said work pallet from said one of said supporting portions located on said predetermined position toward said supporting portion of said machine tool, said movable hook being moved from said releasing position to said latching position by a pushing force acting on said stopper portion thereof from said work pallet fed from said pallet mounting portion of said machine tool onto said one of said supporting portions of said turntable, and moved from said latching position to said releasing position by a pushing force acting thereon from said work pallet when said one of said supporting portions departs from said predetermined position in said rotational direction of said turntable.

2. A pallet changer according to claim 1, wherein said table-indexing unit includes a first stopper unit supported on said base unit, and a plurality of second stopper units supported on said turntable and spaced from each other in said rotating direction of said turntable at intervals equidistant to those of said supporting portions, each of said second stopper units being movable between an engaging position in which said first stopper can catch and lock said second stopper unit when a corresponding one of said supporting portions arrives at said predetermined position and a disengaging position in which said first stopper unit can not catch said second stopper unit, each of said second stopper units being connected with said movable hook only when a corresponding one of said supporting portions of said turntable is located at said predetermined position, and moved from one of said disengaging and engaging positions to the other position in accordance with a movement of said movable hook from one of said latching and releasing positions to the other position.

3. A pallet changer according to claim 2, wherein said first stopper unit includes a casing fixed to said base unit and a pair of spaced stopper pins for catching therebetween one of said second stopper units, at least one of said stopper pins being moved to receive said one of said second stopper units between said stopper pins by a pushing force acting thereon from one of said second stopper units when a corresponding one of said supporting portions of said turntable arrives at said predetermined position.

4. A pallet changer according to claim 1, wherein said base unit is provided with an annular guide member for guiding said work pallets in said rotational direction of said turntable to prevent a radial movement of said work pallets while said supporting portions of said turntable are located apart from said predetermined position, said annular guide member having a notch within which said movable hook is disposed.

5. A pallet changer according to claim 1, further comprising a braking unit for applying a brake force on said turntable when each of said supporting portions of said turntable approaches said predetermined position.

6. A pallet changer according to claim 1, wherein said turntable is provided on each of said supporting portions with a plurality of guide rollers in a radial direction thereof for supporting and smoothly guiding said work pallet on said turntable.

7. A pallet changer according to claim 1, wherein said base unit is provided integrally with a junction guide unit having a plurality of guide rollers for supporting and guiding said work pallet between said pallet mounting portion of said machine tool and one of said supporting portions located at said predetermined position.

* * * * *